UNITED STATES PATENT OFFICE.

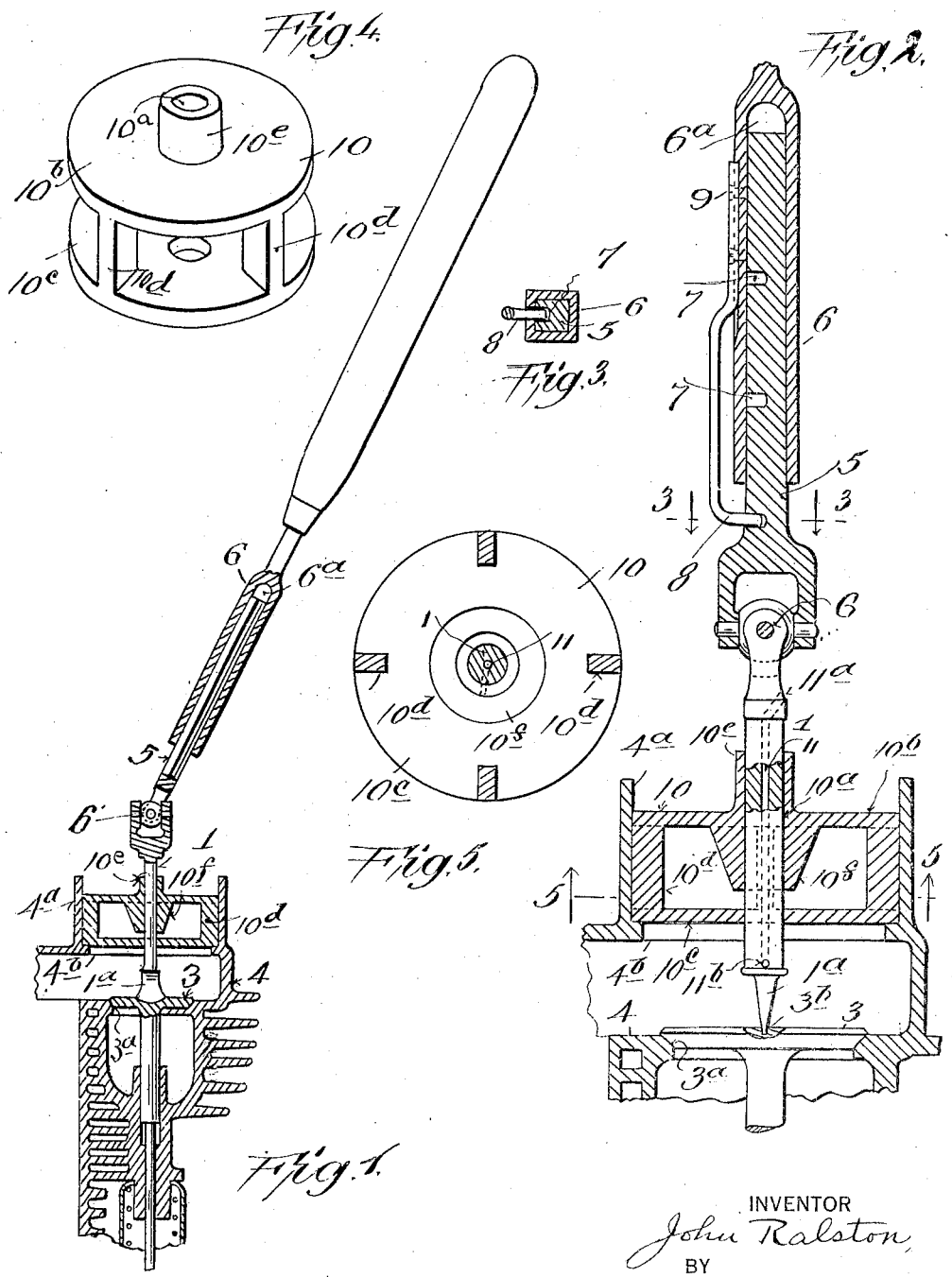

JOHN RALSTON, OF HOUSTON, TEXAS.

VALVE-GRINDER.

1,346,420.  Specification of Letters Patent.  Patented July 13, 1920.

Application filed October 24, 1919. Serial No. 332,865.

*To all whom it may concern:*

Be it known that I, JOHN RALSTON, a citizen of the United States, and resident of Houston, in the county of Harris and State of Texas, have invented certain new and useful Improvements in Valve-Grinders, of which the following is a specification.

The object of my invention is to provide a tool adapted to rotate valves of an internal combustion engine for grinding the same on their seats. My invention has particular reference to a valve grinding tool adapted for use in certain kinds of motor cycle engines. My improved tool is adapted to be connected with the cylinder of the engine in such a manner as to permit accurate and quick operation of the valve for grinding it, and whereby the handle of the tool may be set at a convenient angle for manipulation, and may be lengthened or shortened according to requirements.

My invention comprises novel details of improvement that will be more fully hereinafter set forth and then pointed out in the claims.

Reference is to be had to the accompanying drawings forming a part hereof wherein Figure 1 is a sectional view illustrating my improvements in connection with an explosive engine cylinder and its valves;

Fig. 2 is an enlarged detail section showing parts at an angle to their positions in Fig. 1;

Fig. 3 is a section on the line 3—3 in Fig. 2;

Fig. 4 is a detail perspective of the bearing member for the rotary valve-engaging stem of the tool; and Fig. 5 is a section on the line 5—5 in Fig. 2.

Similar numerals of reference indicate corresponding parts in the several views.

The numeral 1 indicates the stem or shank of my improved tool which at one end is pointed or shaped at $1^a$ in the nature of a tip which may be substantially similar to the beveled end of a screw driver, adapted to engage the usual slot of the valve 3 of the explosive engine 4. The stem 1 is adapted to be operated by the handle member 5 by means of a universal joint 6 connecting said parts so that said handle member may be rotated in axial alinement with respect to said stem or at an angle thereto. By preference the handle is made extensible for which purpose I have shown the handle member 5 entering a bore $6^a$ in handle member 6, which parts may have polygonal cross section for rotating member 5 by the member 6. In order to permit the handle to be used at different lengths I have shown the member 5 provided with spaced holes 7 adapted to receive a prong 8 secured as at 9 upon member 6, which prong may be of spring-like material to enable it to be moved out of one hole and adjusted in another hole according to the length of the handle desired for rotating the valve. The stem 1 is journaled in a bearing member 10 which is shown in cylindrical form adapted to fit within the cylindrical portion $4^a$ of the engine casing beyond the valve seat $3^a$, which bearing member has an axial guiding bore $10^a$ rotatively receiving the stem 1. The bearing member 10 may be cast in a single piece of metal or made of separate parts fastened together and is shown comprising upper and lower disk-like parts $10^b$, $10^c$ connected by intermediate webs $10^d$, hub portions $10^e$ and $10^f$ upon the part $10^b$ serving to guide the stem 1. The tip $1^a$ of the universal joint 6 may be removably secured to stem 1 in any desired manner to permit insertion of the stem in the bearing bore $10^a$ of the bearing member 10. The stem 1 is shown provided with a bore 11 having an inlet opening $11^a$ and an outlet opening $11^b$ for oil. The opening $11^a$ is above the bearing member 10, and outlet $11^b$ is below said bearing member and above the valve when the tool is fitted to the engine whereby oil may be fed through the stem upon the valve.

Assuming that my improved valve grinder is used upon a well known motor cycle engine, the dome of the engine cylinder first will be removed together with connecting parts on the outside of the dome to permit the removal of valve 3 for its examination as well as application to the valve and its seat of desired grinding material. The valve will then be placed upon its seat, and bearing member 10 of the valve grinder will be inserted in bore $4^a$ of the cylinder to rest upon the flange $4^b$ and the tip $1^a$ will be inserted in the slot $3^b$ of the valve, whereby the stem 1 will be guided accurately in axial alinement with the valve. The handle 5 will then be rotated to cause rotation of stem 1 for rotating the valve in a manner adapted to cause grinding of the valve upon its seat. When the stem is being rotated the handle 5 may be held in any desired position with relation to the stem for its most convenient rotation which is permitted by means of the universal joint 6. Oil may be fed to the valve through the bore 11 of the stem as required. The member 10 may be quickly removed and replaced with stem 1 as often as desired while the valve is being ground, and bearing member 10 will accurately retain the stem 1 in axial alinement with the valve so that the latter will not be tilted nor operated inaccurately on its seat by the action of the stem.

My improved valve grinding tool is simple in construction, cheap to manufacture, efficient in use, and not liable to get out of order.

Changes may be made in the details of construction set forth within the scope of the appended claims without departing from the spirit of my invention.

Having thus described my invention, what I claim and desire to secure by Letters Patent, is:—

1. A valve grinder comprising a bearing member adapted to be fitted in an engine casing, a stem guided in said member and having a portion to engage a valve, and a handle attached to said stem by a universal joint for rotating the stem with the handle at an angle to the axis of the stem as well as axially therewith.

2. A valve grinder comprising a bearing member adapted to be fitted in an engine casing, a stem guided in said member and having a portion to engage a valve, and a handle attached to said stem for rotating the latter, said stem having a bore provided with an inlet on one side of said bearing member and an outlet on the other side thereof adjacent to the tip portion.

3. A valve grinder comprising a bearing member adapted to be fitted in an engine casing, a stem guided in said member and having a portion to engage a valve, a handle attached to said stem for rotating the latter, an extensible member slidably connected with the handle to rotate the latter, and means to retain said handle members at different positions of adjustment one upon another.

4. A valve grinder comprising a bearing member adapted to be fitted in an engine casing, a stem guided in said member and having a portion to engage a valve, a handle attached to said stem for rotating the latter, an extensible member slidably connected with the handle to rotate the latter, said handle member having spaced holes and said adjustable member having a prong adapted to enter said holes.

5. A valve grinder comprising a cylindrical bearing member adapted to fit in an engine casing opposite the valve, said member having an axial bearing bore, a stem fitted in said bore and provided on one side thereof with a tip to engage the valve, a universal joint connected with said stem on the side of said bearing member opposite said tip, and a handle connected to said joint for rotating the stem with the handle at an angle thereto as well as axially thereof.

Signed at Houston in the county of Harris and State of Texas this 15th day of October, A. D. 1919.

JOHN RALSTON.